(12) United States Patent
Starbuck et al.

(10) Patent No.: US 9,305,079 B2
(45) Date of Patent: Apr. 5, 2016

(54) ADVANCED SPAM DETECTION TECHNIQUES

(71) Applicant: Microsoft Technology Licensing, LLC, Redmond, WA (US)

(72) Inventors: Bryan T. Starbuck, Redmond, WA (US); Robert L. Rounthwaite, Fall City, WA (US); David E. Heckerman, Bellevue, WA (US); Joshua T. Goodman, Redmond, WA (US); Eliot C. Gillum, Los Gatos, CA (US); Nathan D Howell, Seattle, WA (US); Kenneth R. Aldinger, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/957,313

(22) Filed: Aug. 1, 2013

(65) Prior Publication Data

US 2013/0318116 A1 Nov. 28, 2013

Related U.S. Application Data

(62) Division of application No. 10/601,741, filed on Jun. 23, 2003, now Pat. No. 8,533,270.

(51) Int. Cl.
*G06F 15/16* (2006.01)
*G06F 17/30* (2006.01)
(Continued)

(52) U.S. Cl.
CPC .......... *G06F 17/3061* (2013.01); *G06Q 10/107* (2013.01); *H04L 12/585* (2013.01); *H04L 51/12* (2013.01)

(58) Field of Classification Search
CPC ....... H04L 51/12; H04L 12/585; H04L 51/08; H04L 12/5855; H04L 51/04; H04L 51/22; H04L 63/1483; H04L 67/20; H04L 63/145; H04L 63/1416; H04L 67/16; H04L 63/1441; H04L 67/02; H04L 69/22; H04L 63/102
See application file for complete search history.

(56) References Cited

U.S. PATENT DOCUMENTS 5,377,354 A 12/1994 Scannell et al.
5,619,648 A 4/1997 Canale et al.
(Continued)

FOREIGN PATENT DOCUMENTS

EP 0413537 A2 2/1991
EP 0720333 A2 7/1996
(Continued)

OTHER PUBLICATIONS

Allman, "Spam, Spam, Spam, Spam, Spam, the FTC, and Spam," Queue, Sep. 2003, pp. 62-69, vol. 1, Issue 6, ACM.
(Continued)

*Primary Examiner* — Djenane Bayard
(74) *Attorney, Agent, or Firm* — Sandy Swain; Micky Minhas; Lee & Hayes PLLC

(57) ABSTRACT

The subject invention provides for an advanced and robust system and method that facilitates detecting spam. The system and method include components as well as other operations which enhance or promote finding characteristics that are difficult for the spammer to avoid and finding characteristics in non-spam that are difficult for spammers to duplicate. Exemplary characteristics include analyzing character and/or number sequences, strings, and sub-strings, detecting various entropy levels of one or more character sequences, strings and/or sub-strings and analyzing message headers.

20 Claims, 9 Drawing Sheets

(51) Int. Cl.
*G06Q 10/10* (2012.01)
*H04L 12/58* (2006.01)

(56) References Cited

U.S. PATENT DOCUMENTS

| | | | |
|---|---|---|---|
| 5,638,487 A | 6/1997 | Chigier | |
| 5,704,017 A | 12/1997 | Heckerman et al. | |
| 5,805,801 A | 9/1998 | Holloway et al. | |
| 5,835,087 A | 11/1998 | Herz et al. | |
| 5,884,033 A | 3/1999 | Duvall et al. | |
| 5,905,859 A | 5/1999 | Holloway et al. | |
| 6,003,027 A | 12/1999 | Prager | |
| 6,023,723 A | 2/2000 | McCormick et al. | |
| 6,047,242 A | 4/2000 | Benson | |
| 6,052,709 A | 4/2000 | Paul | |
| 6,074,942 A | 6/2000 | Lou | |
| 6,101,531 A | 8/2000 | Eggleston et al. | |
| 6,112,227 A | 8/2000 | Heiner | |
| 6,161,130 A | 12/2000 | Horvitz et al. | |
| 6,167,434 A | 12/2000 | Pang | |
| 6,192,360 B1 | 2/2001 | Dumais et al. | |
| 6,195,698 B1* | 2/2001 | Lillibridge et al. | 709/225 |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,327,617 B1 | 12/2001 | Fawcett | |
| 6,330,590 B1 | 12/2001 | Cotten | |
| 6,370,526 B1 | 4/2002 | Agrawal et al. | |
| 6,393,465 B2 | 5/2002 | Leeds | |
| 6,397,205 B1* | 5/2002 | Juola | 1/1 |
| 6,421,709 B1 | 7/2002 | McCormick et al. | |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,633,855 B1 | 10/2003 | Auvenshine | |
| 6,643,686 B1 | 11/2003 | Hall | |
| 6,684,201 B1 | 1/2004 | Brill | |
| 6,691,156 B1 | 2/2004 | Drummond et al. | |
| 6,701,440 B1 | 3/2004 | Kim et al. | |
| 6,728,690 B1 | 4/2004 | Meek et al. | |
| 6,732,149 B1* | 5/2004 | Kephart | 709/206 |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 | 8/2004 | Bates et al. | |
| 6,842,773 B1 | 1/2005 | Ralston et al. | |
| 6,915,334 B1 | 7/2005 | Hall | |
| 6,928,465 B2 | 8/2005 | Earnest | |
| 6,971,023 B1 | 11/2005 | Makinson et al. | |
| 7,003,555 B1 | 2/2006 | Jungck | |
| 7,051,077 B2 | 5/2006 | Lin | |
| 7,117,358 B2 | 10/2006 | Bandini et al. | |
| 7,155,484 B2 | 12/2006 | Malik | |
| 7,263,607 B2 | 8/2007 | Ingerman et al. | |
| 2001/0046307 A1 | 11/2001 | Wong | |
| 2002/0016956 A1 | 2/2002 | Fawcett | |
| 2002/0026462 A1* | 2/2002 | Shotton et al. | 707/523 |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0188689 A1 | 12/2002 | Michael | |
| 2002/0199095 A1 | 12/2002 | Bandini et al. | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0149733 A1 | 8/2003 | Capiel | |
| 2003/0167311 A1 | 9/2003 | Kirsch | |
| 2003/0191969 A1 | 10/2003 | Katsikas | |
| 2003/0204569 A1* | 10/2003 | Andrews et al. | 709/206 |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0054887 A1 | 3/2004 | Paulsen, Jr. et al. | |
| 2004/0073617 A1 | 4/2004 | Milliken et al. | |
| 2004/0083270 A1 | 4/2004 | Heckerman et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0162795 A1* | 8/2004 | Dougherty et al. | 706/20 |
| 2004/0177120 A1 | 9/2004 | Kirsch | |
| 2004/0199585 A1 | 10/2004 | Wang | |
| 2004/0199594 A1 | 10/2004 | Radatti et al. | |
| 2004/0210640 A1 | 10/2004 | Chadwick et al. | |
| 2004/0255122 A1 | 12/2004 | Ingerman et al. | |
| 2004/0260776 A1 | 12/2004 | Starbuck et al. | |
| 2005/0015455 A1 | 1/2005 | Liu | |
| 2005/0076084 A1 | 4/2005 | Loughmiller et al. | |
| 2005/0091321 A1 | 4/2005 | Daniell et al. | |
| 2005/0114452 A1 | 5/2005 | Prakash | |
| 2005/0120019 A1 | 6/2005 | Rigoutsos et al. | |
| 2005/0160148 A1 | 7/2005 | Yu | |
| 2005/0165895 A1 | 7/2005 | Rajan et al. | |
| 2006/0036701 A1 | 2/2006 | Bulfer et al. | |
| 2009/0019126 A1* | 1/2009 | Adkins | 709/206 |
| 2011/0173677 A1* | 7/2011 | Tarbotton et al. | 726/3 |

FOREIGN PATENT DOCUMENTS

| | | |
|---|---|---|
| EP | 1376427 A2 | 1/2004 |
| JP | 2001313640 A | 11/2001 |
| WO | WO9635994 A1 | 11/1996 |
| WO | WO9967731 A1 | 12/1999 |
| WO | WO02071286 A2 | 9/2002 |
| WO | WO2004059506 A1 | 7/2004 |

OTHER PUBLICATIONS

Androutsopoulos et al., An Experimental Comparison of Naive Bayeisan and Keyword-based Anti-spam Filtering with Personal E-mail Messages, Proceedings of the 23rd ACM SIGIR Conference, pp. 160-167, 2000.

Androutsopoulos et al., "Learning to Filter Spam E-mail: A Comparison of a Naive Bayesian and a Memory-based Approach," 4th PKDD's Workshop on Machine Learning and Textual Information Access, 2000, 13 pages.

Argamon et al., "Routing documents according to style," In First International Workshop on Innovative Information Systems, 1998, 8 pages.

Balter et al., "Bifrost Inbox Organizer: Giving Users Control Over the Inbox," NordiCHI Oct. 2002, pp. 111-118, Arhus, Denmark.

Bowman, "Hotmail Spam Filters Block Outgoing E-Mail," CNETNEW.com, Jan. 18, 2001, 3 pages.

Broder et al., "Syntactic Clustering of the Web," SRC Technical Note, Digital Corporation, Jul. 25, 1997, 13 pages.

Translated Chinese Office Action mailed on Jan. 27, 2011 for Chinese Patent Application No. 200410063106.2, a counterpart foreign application of U.S. Appl. No. 10/601,741, 6 pages.

The Chinese Office Action mailed Nov. 2, 2012 for Chinese patent application No. 200410063106.2, a counterpart foreign application of U.S. Appl. No. 10/601,741, 9 pages.

The Chinese Office Action mailed Apr. 1, 2012 for Chinese patent application No. 200410063106.2, a counterpart foreign application U.S. Appl. No. 10/601,741, 7 pages.

Cohen, "Learning Rules that Classify E-Mail," In the Proceedings of the 1996 AAAI Spring Symposium on Machine Learning in Infor-

(56) References Cited

OTHER PUBLICATIONS mation Access, Downloaded from William Cohen's web page: <<http://www.research.att.com/nwcohen/pubs.html>> 8 pages.

Cranor et al., "Spam!" Communications of the ACM, 1998, pp. 74-83, vol. 41, No. 8.

Cunningham, "A Case-Based Approach to Spam Filtering that Can Track Concept Drift," Trinity College, Dublin, Dept of Computer Science, May 13, 2003, 9 pages.

Dwork et al., "Pricing Via Processing or Combatting Junk Mail," Presented at Crypto 1992, pp. 1-11.

European Search Report dated Apr. 6, 2006, and mailed Apr. 6, 2006 for EP 04102242, 3 pages.

European Search Report dated Feb. 23, 2007, mailed Feb. 28, 2007 for European Patent Application Serial No. 05105308, 4 pages.

European Search Report dated Jul. 5, 2006, mailed Jul. 24, 2006 for European Application No. EP 06012631, 3 pages.

European Search Report dated Jan. 17, 2006, mailed Jan. 31, 2006, for PCT Application Serial No. PCT/US04/05501, 2 pages.

European Search Report, EP31102NN904awe, mailed Jan. 27, 2005.

European Search Report, dated Nov. 11, 2004 EP31087TE900, mailed Nov. 11, 2004.

Fawcett, "'In Vivo' Spam Filtering: A Challenge Problem for KDD," SIGKDD Explorations, Dec. 2003, pp. 140-148, vol. 5, Issue 2, ACM.

Federal Trade Commission, "False Claims in Spam," A report by the FTC's division of marketing practices, Apr. 30, 2003, <<http://www.ftc.gov/reports/spam/030429spamreport.pdf>>.

Gee, "Using Latent Semantic Indexing to Filter Spam," Dept. of Computer Science and Engineering, University of Texas-Arlington, 5 pages.

Graham, "A Plan for Spam," Online! Aug. 2002, XP002273602, <<http://www.paulgraham.com/spam.html>> retrieved on Mar. 12, 2004.

Graham, The Future of Spam,, 2003, Computer Journal, CSI Computer Security Institute, vol. 19, No. 1, 6 pages.

Hansell, "Internet is losing ground in battle against spam," The New York Times: Technology section, Apr. 22, 2003.

Hidalgo, "Evaluating Cost-Sensitive Unsolicited Bulk Email Categorization," SAC 2002, pp. 615-620, ACM Madrid, Spain.

The Indian Office Action mailed Nov. 26, 2013 for Indian patent application No. 913/DEL/2004, a counterpart foreign application of U.S. Pat. No. 8,533,270, 2 pages.

Iwayama et al., "Hierarchical Bayesian Clustering for Automatic Text Classification," Natural Language, 1995, pp. 1322-1327.

J. Byrne, "My Spamblock," Google, Jan. 19, 1997, 2 pages.

Joachims, "Text Categorization with Support Vector Machines: Learning with Many Relevant Features," LS-8 Report 23, Nov. 1997, 18 pages.

Joachims, "Transductive Inference for Text Classification Using Support Vector Machines," In Proceedings of the 16th International Conference on Machine Learning, 1999, pp. 200-209, San Francisco, USA.

Koller et al., "Hierarchically Classifying Documents Using Very Few Words," In ICML 1997: Proceedings of the Fourteenth International Conference on Machine Learning; San Francisco, CA: Morgan Kaufmann 1997, 9 pages.

Koller et al., "Toward Optimal Feature Selection," Machine Learning; Proc. of the Thirteenth International Conference, Morgan Kaufmann, 1996, 9 pages.

Lewis, "A Comparison of Two Learning Algorithms for Text Categorization," Third Annual Symposium on Document Analysis and Information Retrieval, Apr. 11-13, 1994, pp. 81-93.

Lewis, "An Evaluation of Phrasal and Clustered Representations on a Text Categorization Task," 15th Annual International SIGIR 1992, Denmark 1992, pp. 37-50.

Lewis, "Representation and Learning in Information Retrieval," University of Massachusetts, 1992.

Li et al., "Classification of Text Documents," Department of Computer Science and Engineering, Michigan State University, E. Lansing, Michigan, The Computer Journal, vol. 41, No. 8, 1998; 537-546.

Li et al., "Secure Human-Computer Identification against Peeping: A Survey," Technical Report, Microsoft Research, 2003, 53 pages.

Madigan, "Statistics and the War on Spam," Rutgers University, pp. 1-13, 2003.

Manco et al., "Towards an Adaptive Mail Classifier," In Proc. of Italian Association for Artificial Intelligence Workshop, 2002, 12 pages.

Massey et al., "Learning Spam: Simple Techniques for Freely-Available Software," Proceedings of Freenix Track 2003 Usemix Annual Technical Conference, Online!, Jun. 9, 2003, pp. 63-76, Berkley, CA, USA.

Mitchell, "Machine Learning," Carnegie Mellon University, Bayesian Learning, Chapter 6, pp. 180-184.

Mock, "An Experimental Framework for Email Categorization and Management," Proceedings of the 24th Annual International ACM SIGIR Conference, pp. 392-393, 2001.

Notice of Rejection mailed Feb. 19, 2010 from Japanese Patent Application No. 2004-148162 (listing reference "Tackle spam which has not been no concern of ours").

Obrien et al., "Spam Filters: Bayes vs. Chi-squared; Letters vs. Words," Proceedings of the 1st International Symposium on Information and Communication Technologies, 2003, pp. 291-296, Dublin, Ireland.

Palme et al., "Issues When Designing Filters in Messaging Systems," Department of Computer and Systems Sciences, Stockholm University, Royal Institute of Technology, Skeppargarten 73, S-115 30, Stickholm, Sweden, Computer Communications; 1996; pp. 95-101.

Pantel "SpamCop: A Spam Classification & Organization Program," In Proc. AAAI-1998 Workshop on Learning for Text Categorization, 1998, 8 pages.

Partial European Search Report, EP33823TE900kap, mailed Jun. 21, 2005.

Partial European Search Report, EP31102RK900df, mailed Oct. 19, 2004.

Rennie, "ifile: An Application of Machine Learning to E-Mail Filtering," Proceedings of the KDD-2000 Workshop on Text Mining, Sixth ACM SIGKDD International Conference on Knowledge Discovery and Data Mining, 2000, 6 pages.

Rosen, "E-Mail Classification in the Haystack Framework," Massachusetts Institute of Technology, Feb. 2003.

Sahami, "A Bayesian Approach to Filtering Junk E-Mail," Stanford University.

Sahami, "Learning Limited Dependence Bayesian Classifiers," In KDD-96: Proceedings of the Second International Conference on Knowledge Discovery and Data Mining: AAAI Press, 1996, Menlo Park, CA, p. 335-338.

Schutze, "A Comparison of Classifiers and Document Representations for the Routing Problem," Proceedings of the 18th Annual International ACM SIGIR Conference on Research and Development in Information Retrieval, Seattle, WA, Jul. 9-13, 1995; pp. 229-237.

Sebastiani, "Machine Learning in Automated Text Categorization," ACM Computing Surveys, vol. 34, Issue 1, pp. 1-47, 2002.

Segal et al., "SwiftFile: An Intelligent Assistant for Organizing E-Mail," IBM Thomas J. Watson Research Center.

Simard et al., "Using Character Recognition and Segmentation to Tell Computer from Humans," International Conference on Document Analysis and Recognition (ICDAR), IEEE Computer Society, Los Alamitos, pp. 418-423, 2003.

Skoll, "How to Make Sure a Human is Sending You Mail," Google, Nov. 17, 1996, 2 pages.

Spertus, "Smokey: Automatic Recognition of Hostile Messages," Proceedings of the Conference on Innovative Applications in Artificial Intelligence (IAAI) 1997, 8 pages.

"Stop, in the Name of Spam," Communications of the ACM, Nov. 1998, pp. 11-14, vol. 41, No. 11, ACM.

"Tackle spam which has not been no concern of ours," Nikkei Internet Technology, No. 12, Nikkei Business Publications, Inc., Japan, Jun. 22, 1998, pp. 85-91.

(56) References Cited

OTHER PUBLICATIONS

Takkinen et al., "CAFE: A Conceptual Model for Managing Information in Electronic Mail," Laboratory for Intelligent Information Systems, Department of Computer and Information Science, Linkoping University, Sweden, Conference on System Sciences, 1998, IEEE.

Turner, "Controlling Spam through Lightweight Currency," In Proc. of the Hawaii International Conference on Computer Sciences, Jan. 2004, 9 pages.

Turner, "Payment-Based Email," 5th International Conference on Software Engineering, Artificial Intelligence, Networking, and Parallel/Distributed Computing, Jun. 2004, 7 pages.

Wong, "Preventing Spams and Relays," Linux Journal, Dec. 1998, 6 pages. vol. 1998, Issue 56es, Specialized Systems Consultants, Inc.

Wong, "SPF Overview," Linux Journal, Apr. 2004, 6 pages, vol. 2004, Issue 120, Specialized Systems Consultants, Inc.

Written Opinion of the International Preliminary Examining Authority, mailed Nov. 30, 2005 for PCT/US03/41526.

Wu et al., "A new anti-Spam filter based on data mining and analysis of email security," Data Mining and Knowledge Discovery: Theory, Tools, and Technology V, Apr. 21, 2003, pp. 147-154.

Yang, "A Comparative Study on Feature Selection in Text Cateogrization," School of Computer Science, Carnegie Mellon University, Pittsburgh, PA, and Verity, Inc., Sunnyvale, CA: 9 pages.

Yang, "An Example-Based Mapping Method for Text Categorization and Retrieval," ACM Transactions on Information Systems, vol. 12, No. 3, Jul. 1994, pp. 252-277.

Wu, "A New Anti-Spam Filter Based on Data Mining and Analysis of Email Security," Conference Proceedings of the SPIE, Data Mining and Knowledge Discovery Theory, Tools and Technology V, vol. 5098, Apr. 21, 2003, pp. 147-154, Orlando, FL, USA.

\* cited by examiner

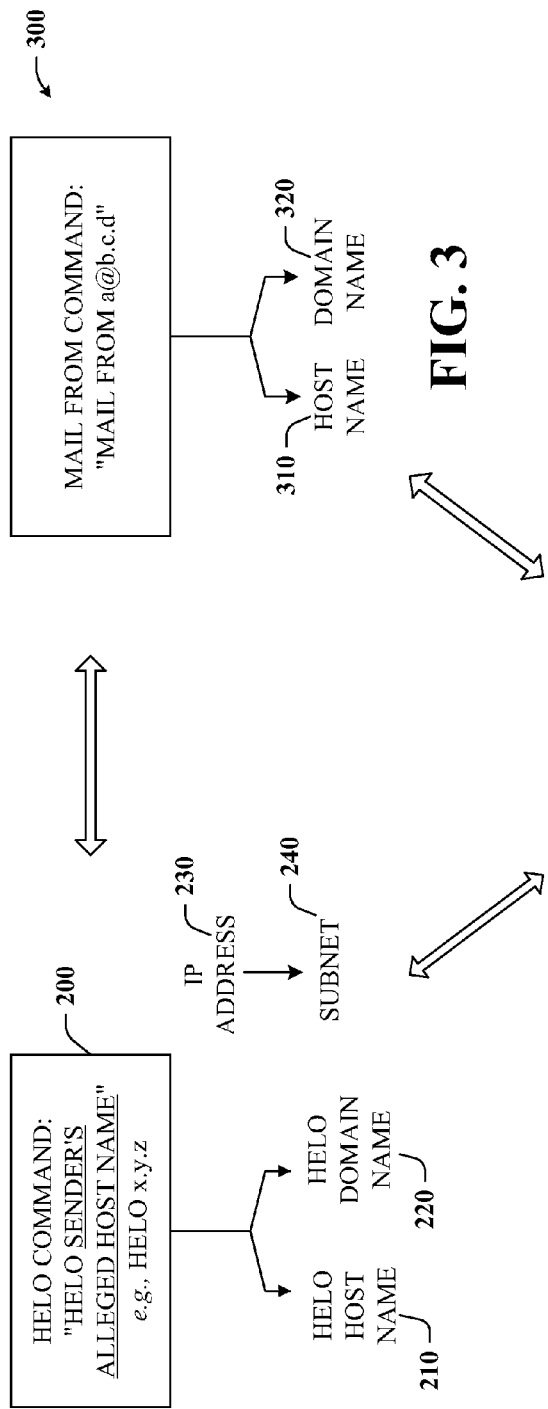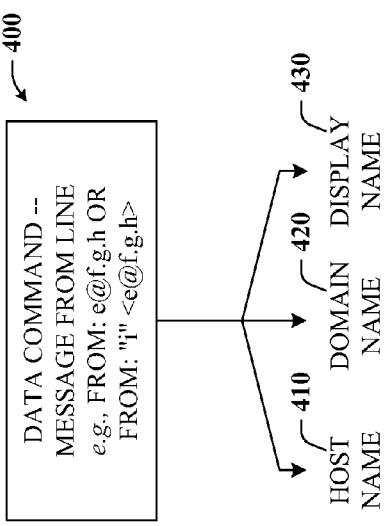

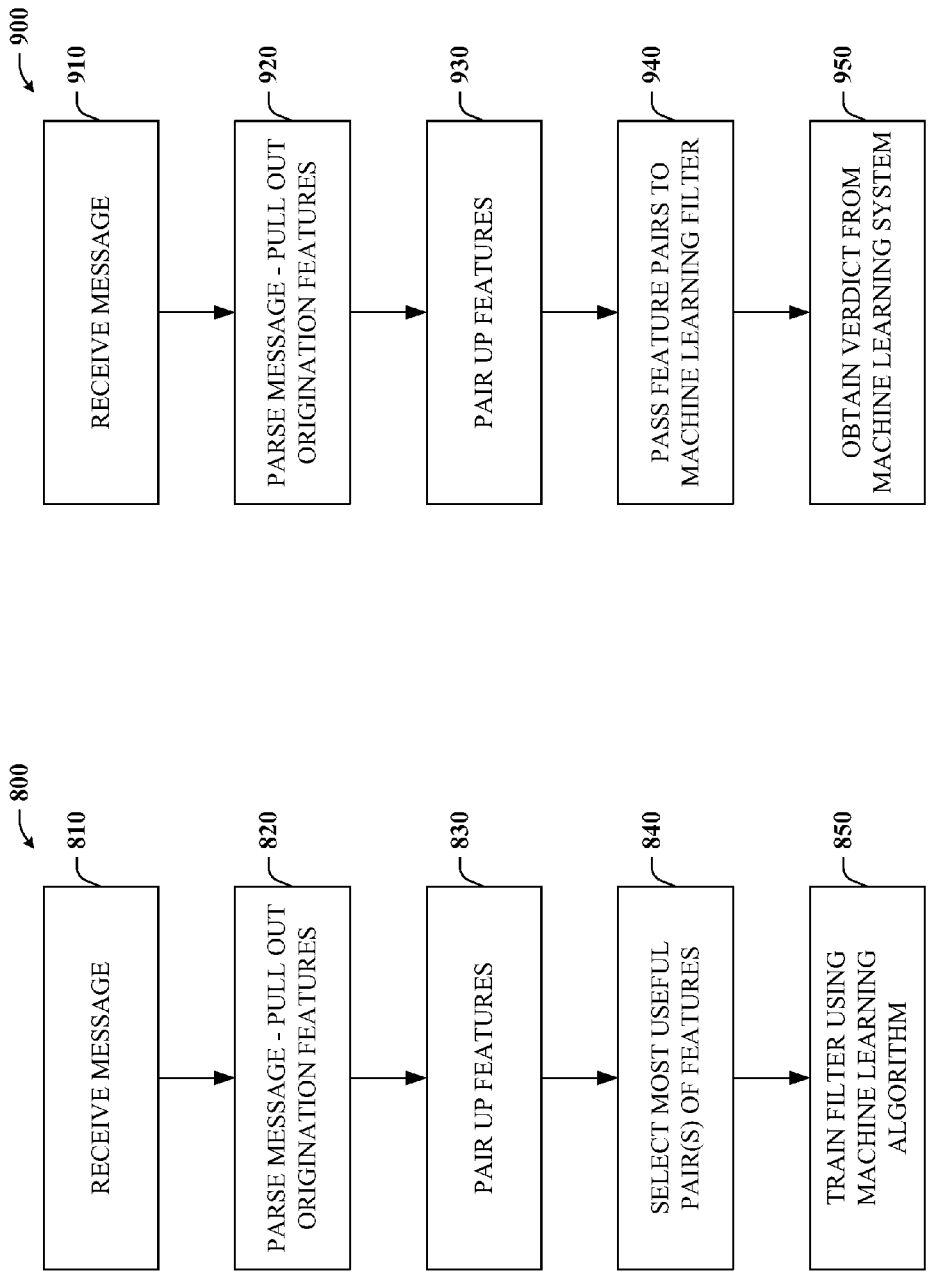

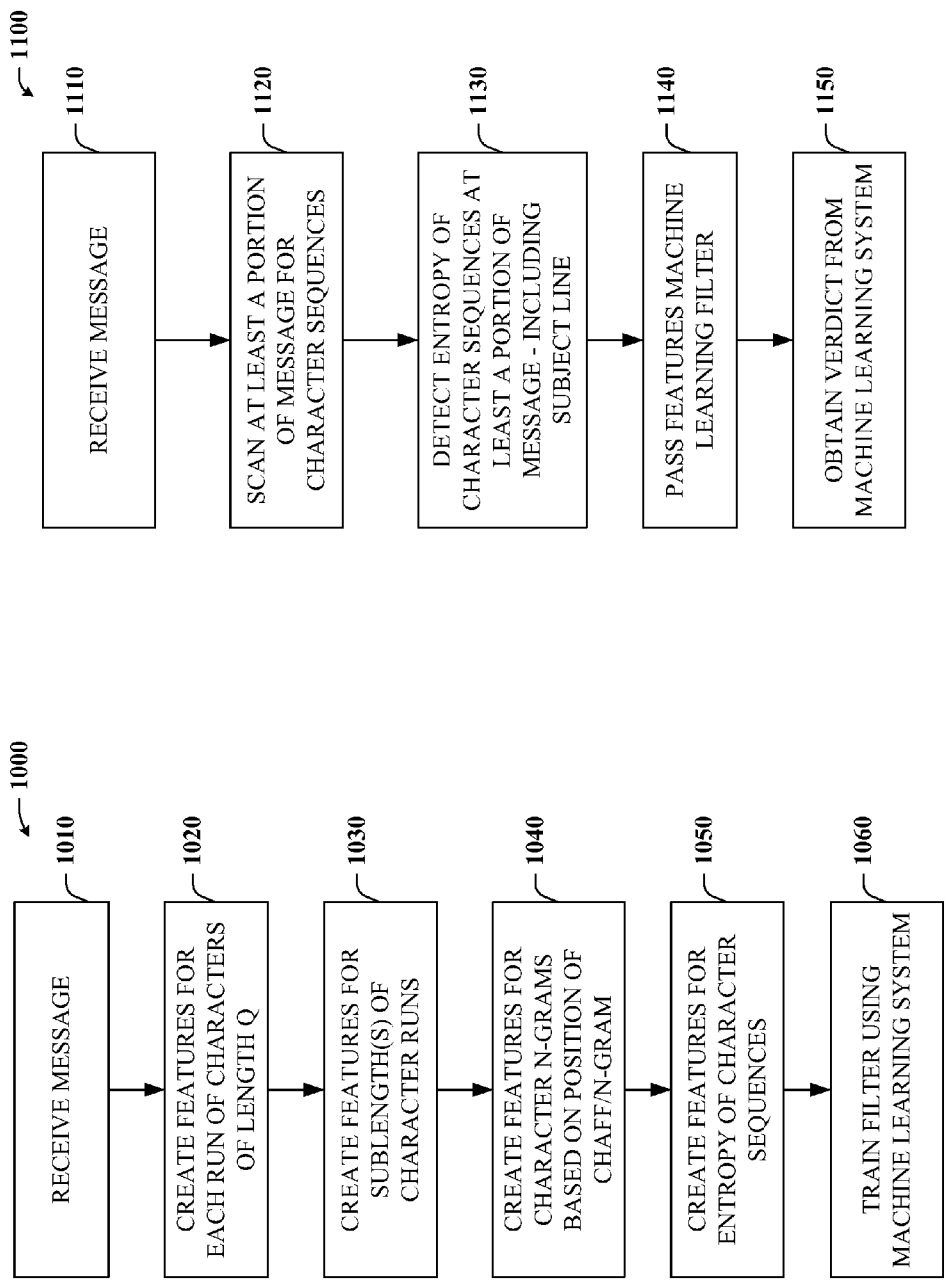

ns, the presence or occurrence of chaff and/or character n-grams can be strong indicators that the message is bad (e.g., spam). The character n-gram can also be position-dependent. Accordingly, features including this position dependence can also be created and employed in accordance with the subject invention.

ADVANCED SPAM DETECTION TECHNIQUES

RELATED APPLICATION INFORMATION

This application claims priority to, and is a divisional of, U.S. patent application Ser. No. 10/601,741, filed Jun. 23, 2003, which is incorporated herein by reference in its entirety.

TECHNICAL FIELD

This invention is related to systems and methods for identifying spam messages, and more particularly that find characteristics that are difficult for spammers to avoid and characteristics in non-spam that are difficult for spammers to duplicate.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

Common techniques utilized to thwart spam involve the employment of filtering systems/methodologies. One proven filtering technique is based upon a machine learning approach. Machine learning filters assign to an incoming message a probability that the message is spam. In this approach, features typically are extracted from two classes of example messages (e.g., spam and non-spam messages), and a learning filter is applied to discriminate probabilistically between the two classes. Since many message features are related to content (e.g., whole words and phrases in the subject and/or body of the message), such types of filters are commonly referred to as "content-based filters". These types of machine learning filters usually employ exact match techniques in order to detect and distinguish spam messages from good messages.

Unfortunately, often spammers can fool conventional machine learning and/or content-based filters by modifying their spam messages to look like good mail or to include a variety of erroneous characters throughout the message to avoid and/or confuse character recognition systems. Thus, such conventional filters provide limited protection against spam.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Spam filters, whether based on machine-learning or on other techniques, must look at the contents of a message to determine whether a message is spam or not. Unfortunately, spammers are sometimes able to disguise many aspects of their messages. They are able to misspell spam-like words, use synonyms, or use images that include words. While a spam filter could use optical character recognition (OCR) software to find the words in images, this is typically too expensive, especially if spammers intentionally use images that are difficult for OCR systems. To mitigate the ability to disguise their messages, features can be generated which are difficult for spammers to fake.

Features are facts detected by an email or message parsing component. The message parsing component can create a feature for each word in the message. It can also create a feature each time punctuation is used which can be dependent upon the kind of punctuation used. Features can be used either by machine learning filters or in many other ways, such as a part of hand-built rules.

The subject invention provides for a system and method that facilitates detecting and preventing spam by including additional features beyond those typically used by conventional spam filters which are difficult for spammers to fake. One such feature involves looking at the pairs of features in a message. Certain features in spam are easily forged, or of little value, when considered separately, but are much more valuable together—that is, when they are considered together. Exemplary features which can be employed as pairs include those derived from or related to the origination information of a message. In particular, a domain and host name in a SMTP (Simple Mail Transfer Protocol), the domain and host name in a HELO command, an IP address or subnet in a Received from header, any domain or host name in a display name, any domain or host name in a Message From field, and any time zones in the last received from header should all match in some way or combination. Hence, pairs of any of the above can be useful for training a machine learning filter or any other rule-based filter.

A second feature involves examining a run of characters. Most conventional features in messages are related to words in the messages, and most typically to space-separated words. However, the fact that a certain character sequence (with or without spaces) occurs in a part of a message can be indicative of spam. Thus, the present invention provides for a system and method that employ features created for each sequence of characters or substantially all possible sequences of characters, including punctuation and spaces. Some spammers may also include chaff at the ends or beginnings of subject lines or messages which can disrupt exact match techniques found in most spam filtering systems. The chaff can include character n-grams such as "xz" or "qp" that rarely occurs in good mail. Thus, the presence or occurrence of chaff and/or character n-grams can be strong indicators that the message is bad (e.g., spam). The character n-gram can also be position-dependent. Accordingly, features including this position dependence can also be created and employed in accordance with the subject invention.

An alternative to using rare character sequences to detect chaff involves yet a third type of feature that can be employed in machine learning systems. The third feature involves detecting high entropy of characters using a character n-gram language model, for example. In this model, a probability of occurrence can be assigned to each character such that certain character sequences are more probable to occur than others. For instance, the character sequence "he" (e.g., as found in "the", "hear", "she", "theater", etc.) is more likely to occur than the sequence "xz" in any given run or string of characters. Thus, the entropy for the character sequence "xz" will be higher than it will be for the sequence "he".

In addition to high entropy, an average entropy of characters can also be detected such as at the end or the beginning of a subject line or of a message. Furthermore, features relating to the relative entropy of characters can be useful. For instance, features can be designated for when an average entropy at the beginning of a subject line is 0.5 higher than the average entropy at the middle of the subject line. Other exemplary features could correspond to an average entropy at the end of a message body being 1.0 more than at the middle of the message. Moreover, each of these detected events of high, average, and/or relative entropy can be employed as separate features.

A fourth type of useful features involves generic headers. Traditional machine learning algorithms only use common features in the subject line and body of messages or features based on other common fields found in a message header. Unlike traditional filters, the present invention utilizes substantially all headers, including the presence or absence of header line types. More importantly, the present machine learning systems can automatically identify all useful header features and in some cases, can even exclude some header lines as well.

According to other aspects of the present invention, additional features of electronic mail (email) communications which can be useful to machine learning techniques include extended sizes of features as well as image features. Since very little spam is very big, the many different sizes of features in combination with at least one other feature discussed hereinabove can facilitate identification of spam. For instance, features can be created to correspond to message size. That is, for message sizes greater than 100 bytes, 200 bytes, and up to b bytes (wherein b is greater than or equal to 1), a feature can be generated for each size or size range. This can also be applied to subject line and display name sizes since spammers often use lengthy display names to confuse and/or disguise the source of the message. Similarly, subject lines of spam tend to include a significant portion of or the entire body of the message since some users never open their messages but instead rely on the subject line alone.

Any of the above described features can be used by machine learning systems to train and improve junk mail and/or spam filters, thereby making it more difficult for spammers to modify their messages around these filters. Moreover, spammers are left with fewer opportunities for spammers to get their spam through messaging systems.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 2 is a schematic diagram of a break down of features from a HELO command in accordance with an aspect of the present invention.

FIG. 3 is a schematic diagram of a break down of features from a MAIL FROM command in accordance with an aspect of the present invention.

FIG. 4 is a schematic diagram of a break down of features from a DATA command in accordance with an aspect of the present invention.

FIG. 8 is a flow diagram of an exemplary method that facilitates creating features including pairs of features to train a filter in accordance with an aspect of the present invention.

FIG. 9 is a flow diagram of an exemplary method that facilitates employing the trained filter of FIG. 8 to identify spam and/or spam-like messages.

FIG. 10 is a flow diagram of an exemplary method that facilitates creating features based on a run of characters and/or on entropy of such run of characters which can be used to train a filter in accordance with an aspect of the present invention.

FIG. 11 is a flow diagram of an exemplary method that facilitates employing the trained filter of FIG. 10 to identify spam and/or spam-like messages.

DETAILED DESCRIPTION OF THE INVENTION

Figure 1:
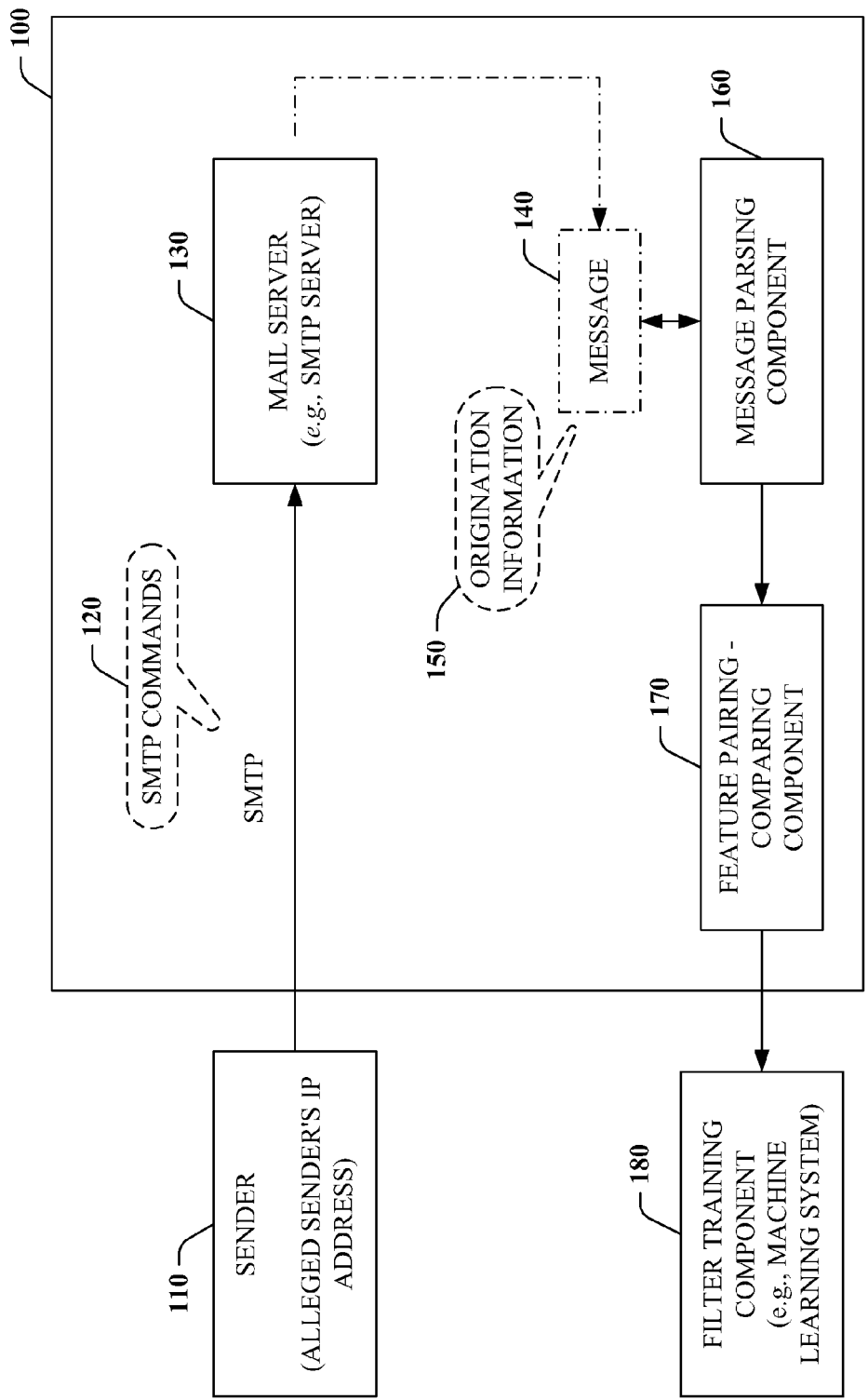
FIG. 1 is a general block diagram of a system that facilitates preventing spam in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter could be trained to automatically filter particular message content (text and images) in order to capture and tag as junk the undesirable content (e.g., commercials, promotions, or advertisements). To give another example, SMS messages for cellular phones can also be filtered.

Referring now to FIG. 1, there is illustrated a general block diagram of a system 100 that facilitates using pairs of features to promote spam detection in accordance with an aspect of the present invention. Some features are especially useful as a pair, even when they are already employed individually. In general, there is information where mail is from that should match. For example, one's IP address is not practical to forge. Thus, a spam filter could be trained to check that some other features are consistent with the IP address feature. Match can be used in a general sense. For instance, the same servers are used to send mail from two domains (e.g., Hotmail and MSN); the HELO command and the "from" command need not provide the same domain, but generally will only occur in certain valid pairs.

As shown in FIG. 1, messages from one or more senders 110 are delivered from their respective sender(s) to a mail server 130, such as an SMTP server, included in the system 100. Delivery of the messages can be accomplished through a number of SMTP commands 120, for example. Other mail delivery protocols are possible and can be applied to the present invention in a similar manner.

Accordingly, a series of SMTP commands can be issued and resolved before the message 140 is accepted by the receiver for delivery. In particular, origination information 150 that can be used for establishing the pairs of features can be found in the SMTP commands 120. In order to derive features from the origination information 150, the information 150 can be evaluated and parsed by a message parsing component 160. After at least a portion of the origination information 150 of the message 140 has been parsed, the parsed portions or features can be communicated to a feature pairing component 170. The feature pairing component 170 can analyze any possible combination of features such that a resulting pair of features is useful as an additional feature. A filter training component 180, which is operatively coupled to the system 100, can make use of the feature pairs when training a spam filter, for example.

Once the filter is sufficiently trained, it can be employed in conjunction with a machine learning system and applied to another group of mail messages to filter spam-like messages from the group. The filter can be periodically updated and/or new filters can be made as needed to effectively distinguish legitimate mail from spam mail.

FIGS. 2-4 depict various features that can be parsed from the origination information found within SMTP commands and that can be combined into a number of useful pairs (e.g., as indicated by the arrows between the figures) in accordance with an aspect of the present invention. For example, in FIG. 2, the first SMTP command can be a HELO command 200 in which the sending machine says its name, such as for instance, HELO x.y.z. If x.y.z is of the form mail1.ddd.com, then "mail1.ddd.com" can be referred to as the host name 210 and "ddd.com" can be referred to as the domain name 220. Hence, host names 210 can be stripped down to domain names 220.

We can also detect the sender's IP address; the SMTP protocol typically is used over TCP/IP, and thus the IP address used for the communication is known to the receiver. IP addresses 230 are often sold or used in groups called subnets 240. Subnets 240 can be defined in various ways, though in practice, one exemplary subnet can be defined as including all IP addresses that share the first 24 bits. Therefore, if the HELO command 200 says HELO ddd.com, there may be multiple machines sending from ddd.com; however, most of the sending machines will be on the same subnet 240.

In general, some pairs of features make less sense than others. For example, the pairing of HELO host name 210 and HELO domain name 220 is less useful since one is derived from the other. However, the pairing of the subnet 240 and the HELO domain name 220 is very useful because at least a portion of these features should match under normal circumstances.

After the HELO command 200, a line comprising x.y.z and the IP address that this message is coming from and the time including an alleged time zone can be appended to a Received from line by a recipient of the message. A spam filter can scan the headers to see what the HELO command 200 said. The sender's alleged time zone (one feature) should match the time stamp (another feature) of the message. Furthermore, the alleged time zone should also match the sender's alleged machine name or IP address in the HELO command 200. A mismatch thereof can be indicative of spam.

Generally, the IP address from the HELO command 200 (e.g., HELO x.y.z) should be the same or match the alleged machine name or IP address in the Received from line, but spammers can forge mail by not using the correct host or domain name for their IP address. Thus, a mismatch here can be indicative of spam. It should be appreciated that it is even less likely for the subnet 240 of the IP address 230 to mismatch a domain name 220 than it is for the IP address 230 to mismatch (a domain name 220).

In the case where some domains have not configured their machines correctly to provide the proper machine name at the HELO command 200, the filter can learn what the particular pair is such that when it sees the pair again (in subsequent messages), it can accept that pair as a proper match. Therefore, the filter can be trained to accommodate personal preferences as well as minor errors or mismatches in the origination information as long as some consistency is maintained between training the filter and using the filter. In addition, a list of possible pairs populated with valid host names and valid IP addresses, for example, can be created such that anything detected in the origination information that is outside of this list is more likely to be spam.

A later command is a MAIL FROM command 300 as demonstrated in FIG. 3 in accordance with an aspect of the present invention. Also known as the Envelope From, the MAIL FROM command can be in the form MAIL FROM a@b.c.d. It should be understood that b.c.d may or may not be the same as x.y.z, though according to the example, it should be. In particular, parts of the host names 310 should typically match. For instance, c.d should be the same as or correspond to y.z to constitute a valid match by the filter. The host name 310 can be further stripped down to a domain name 320 to provide additional pairs of features such as with the HELO IP address 230 (FIG. 2).

Later in the message, such as during a DATA command 400, a line of the form From: e@f.g.h can be added. Again, host name 410 f.g.h can be the same as x.y.z and b.c.d. Alternatively, at least domain name 420 g.h should match y.z and c.d, but not always. The From line is also referred to as the Message from. Sometimes, the line will be of the form From: "i"<e@f.g.h>. The "i" is called a display name 430. Many email clients actually display only the display name "i" rather than e@f.g.h. However, "i" could be in the form of "j@k.l.m", thereby misleading the user about the identity of the message sender. This alone should be indicative of spam because such a display name is atypical. However, if "i" is present in the form "j@k.l.m", then k.l.m should match the other host names; or at the very least, the domain names should match (e.g., l.m corresponding to g.h).

In some cases, it can be inconvenient or difficult to tell if a particular triple (e.g., x.y.z) is a host name or a domain name. At times, a guess that it could be either is necessary. For instance, if the HELO command gives an address of the form x.y.z and the MAIL FROM command has an address of the form y.z, then it can be ascertained with some certainty that x.y.z is a host name and y.z is a domain name. If the HELO command gives an address of the form x.y.z and the MAIL FROM command gives an address of the form b.c.d, then a guess would have to be made that x.y.z and b.c.d are both host names and domain names and that y.z and c.d are domain names. All pairs of guesses can be employed as features rather than just the best guess. Alternatively, the best guess can be used. A variety of simple heuristics for making these guesses can be deduced. In general, when dealing with machine learning systems, it is not important that the guessing always be correct as long as the guessing is consistent for a given kind of mail—so the same feature pairs occur consistently.

Moreover, features relating to the domain and host names in the SMTP MAIL FROM command, the domain and host names in the HELO command, the IP address or subnet in the Received from header, any domain or host name in the Display name, any domain or host name in the Message From, any time zones in the last Received from header, and a type of mailing software used by the sender should all match in some way. Pairs of any of these features are likely to be useful since substantially all of the listed attributes can be forged by spammers, with the exception of IP address and the subnet thereof. Hence, pairs that include the IP address or subnet are especially powerful and useful when combined with any of the other features.

Figure 5:
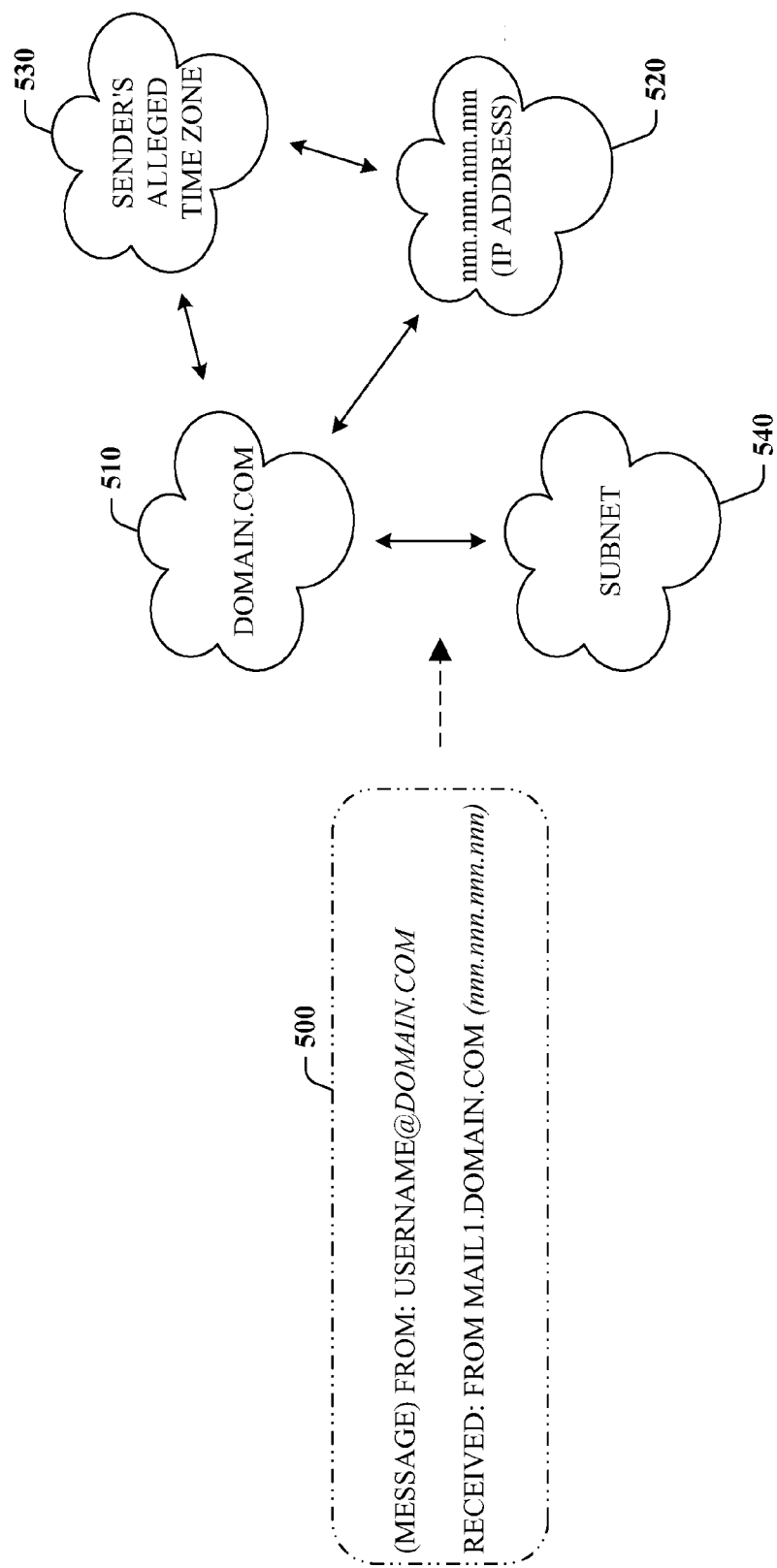
FIG. 5 is a schematic diagram of a break down of features that can be paired up from a Message From line and from a Received line in accordance with an aspect of the present invention.

FIG. 5 demonstrates possible pairs of features that can be derived from a Message From line and a Received from header (collectively 500) of a mail message. As shown, the domain name "domain.com" 510 can be paired to match an IP address 520, a sender's alleged time zone 530, and/or a subnet 540 of the IP address 520. Alternatively or in addition, the sender's alleged time zone 530 could be paired to match the sender's alleged IP address 520. Other features not illustrated herein as well as other pairs of features not demonstrated in the figure are possible.

Figure 6:
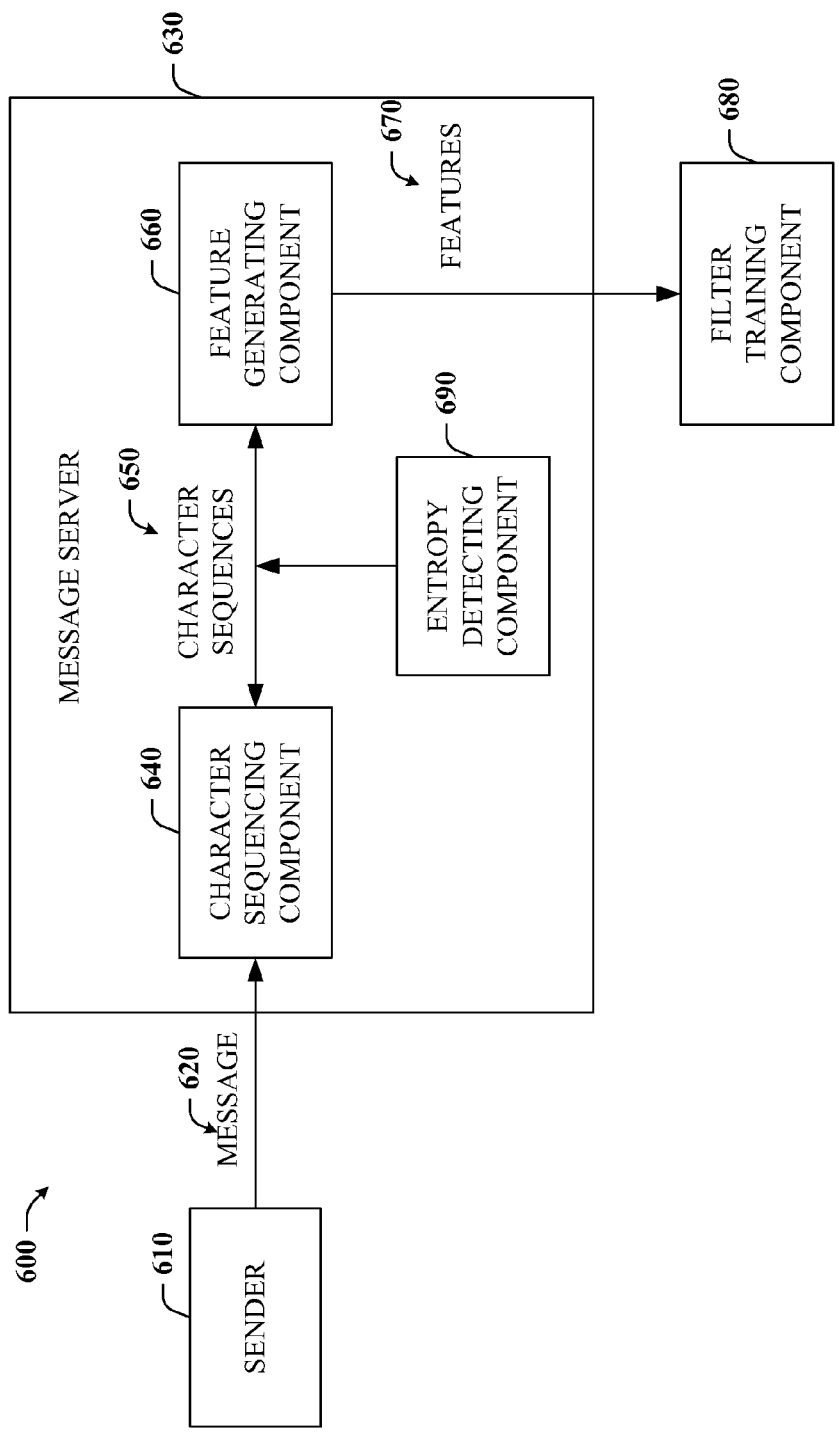
FIG. 6 is a general block diagram of a system that facilitates generating features relating to runs of characters and/or character sequences and/or entropy of such character sequences in accordance with an aspect of the present invention.
Figure 7:
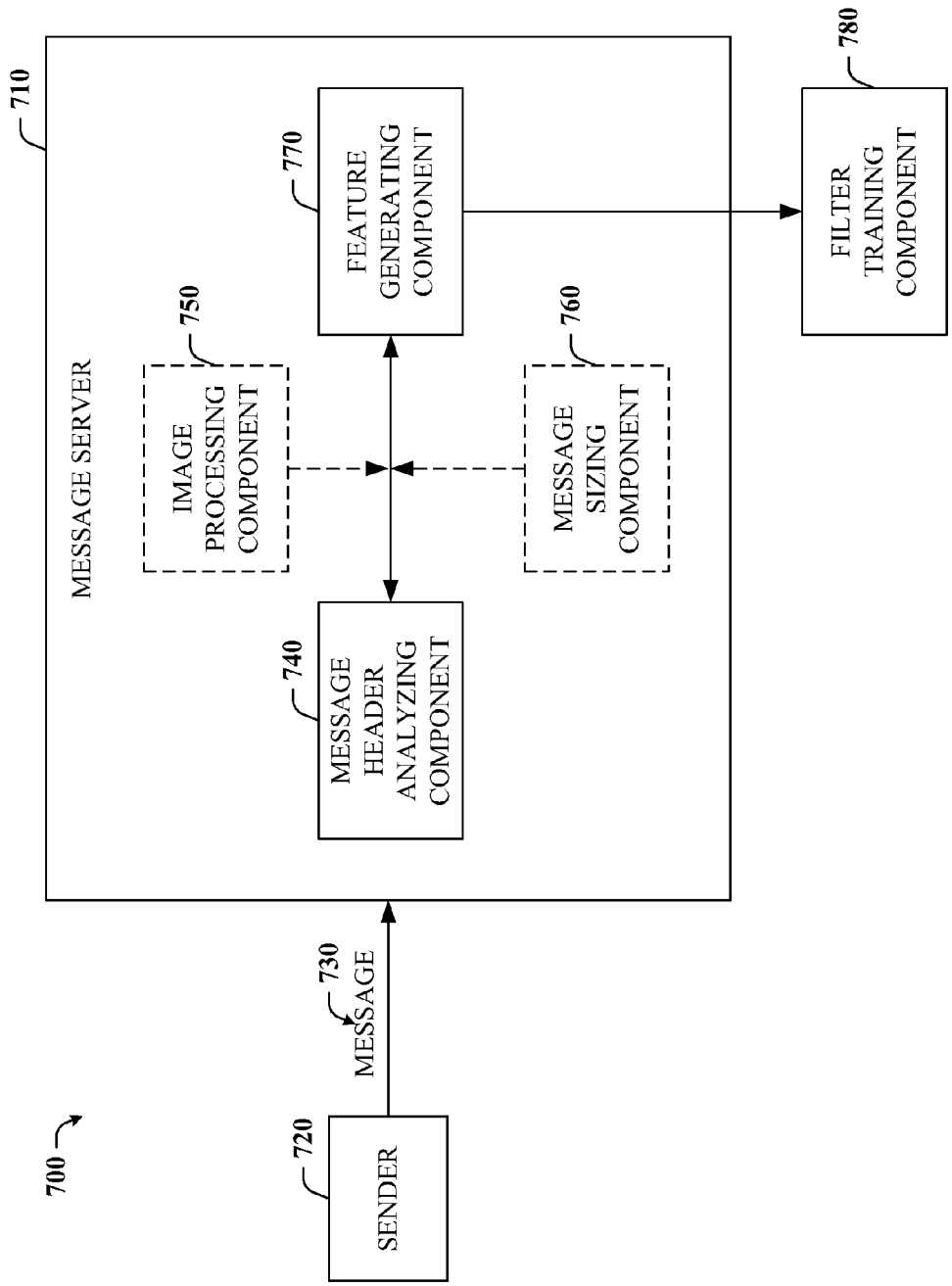
FIG. 7 is a general block diagram of a system that facilitates generating features relating to message header content and/or size-related features and/or images present in the message in accordance with an aspect of the present invention.

FIGS. 6 and 7 represent additional feature generation systems that facilitate advanced spam detection. Referring now to FIG. 6, there is illustrated a block diagram of an exemplary system 600 for creating features as they relate to a run of characters and features based at least in part on the entropy of these character sequences.

Most features in messages are related to words found in the messages. However, the presence of a certain character sequence in a message or in part of a message can also be useful. For instance, sometimes spammers use a character sequence such as "R.I.C.H." instead of "rich" or "RICH". Using a pattern-match technique, words written as "R.I.C.H." can be readily extracted to reveal the base word "RICH".

In addition, spammers sometimes add random letters as chaff to the ends or beginnings of subject lines or messages. This disrupts exact match techniques commonly employed in conventional filters. Since these random character sequences are likely to include character n-grams like "xz" or "qp" that rarely, if ever, occur in good mail, their occurrence in a message can be strong indicators that the message is bad (e.g., spam). Spammers can also evade traditional spam filters by arbitrarily adding in punctuation such as periods and hyphens, as well as symbols, to distort words and/or phrases that are known to be characteristic of spam.

To mitigate this type of intentional manipulation, the system 600 generates features for each possible sequence of characters in order to identify and detect intentional character substitutions, insertions, and misspellings. The system 600 accomplishes this in part by walking through text, character by character, and generating features for each run of length n (e.g., n is an integer greater than or equal to one), which will effectively pick up words, punctuation, spaces, and other content.

For example, a sender 610 sends a message 620 as shown in the figure. The message 620 is delivered to a message server 630 where it can be processed to yield one or more features by a character sequencing component 640. The character sequencing component 640 can analyze at least a portion of the message via searching for particular character sequences, strings and/or sub-strings that are indicative of spam. The sequences, strings and/or sub-strings are not necessarily whole or space-separated words.

For instance, imagine that the message 620 includes the text:

"Get Rich ~-quick-~by Calling now!!!!!"

A run of length 6 would create these exemplary character sequences 650:

"Get Ric"

"et Rich"

"t Rich"

"Rich~-" . . .

A run of length 7 would create these exemplary character sequences 650:

"Rich~-q"

"ich~-qu"

"now!!!!"

As the character sequences 650 are being identified and created, a feature generating component 660 generates corresponding features 670 for each character sequence. Such features 670 can then be used by a filter training component 680 to train a spam filter, for example.

Multiple run lengths from as few as one and up to some length n, for example, for the same message can be utilized to keep track of both the individual lengths (strings) as well as sublengths (substrings).

With respect to character n-grams, the same or different feature can be used depending on where the n-gram occurs. N-grams may be located in From addresses, subject lines, text bodies, html bodies and/or attachments. Furthermore, n-gram features can be generated and employed according to their positions in the message. For instance, since chaff (e.g., comprising n-grams) tends to occur at the beginning or end of a subject, a rare character sequence at the beginning or end of a subject line is more indicative of spam than a rare character sequence in the middle. Hence, the system 600 can be programmed to detect chaff and/or n-grams only at the desired positions, such as the beginning and end of the subject line. Similarly, n-gram features can also be position dependent for the beginning or the end of the message.

The system 600 is also valuable for use with foreign languages, especially those that do not separate words with spaces such as Korean and Japanese dialects (e.g., Hiragana and Katakana). As described above, substantially all sequences of different character lengths can be readily detected. Alternatively, the system 600 can be invoked only when it is suspected that the text is in a foreign language, such as when there are few spaces, when many characters that are rarely used in English are detected (i.e., high byte characters), or when certain Unicode character types are detected. Thus, character n-grams would only be used for characters determined to not have uppercase, lowercase, punctuation or space characteristics. For example, when the message is scanned and very few spaces and/or long strings of high byte characters are detected, then the n-gram sequencing can be invoked. This restricted application of character n-grams can be advantageous over using full character n-grams (e.g., for all messages), as described supra, since full n-grams can be costly and time-consuming to perform for every piece of email.

Using rare character sequences is one way to detect chaff, but it requires making lists of each rare character sequence, of which there can be many. Another way to detect chaff involves detecting high entropy of character sequences in accordance with another aspect of the present invention. Detecting the high entropy of character sequences can be a more cost-effective and efficient manner to identify spam.

Still referring to FIG. 6, the system 600 comprises an entropy detecting component 690 that provides an alternative and/or additional technique to detect chaff. The entropy detecting component can analyze at least a portion of a message via searching for instances of a string of random characters that are indicative of the message being spam.

The entropy of a character sequence is essentially the unlikeliness or the randomness of the sequence. Generally, if the probability P of a character sequence "abc . . . up to z" is defined as P(abc . . . z), then the entropy of the sequence is: $-\log_2 P(abc \ldots z)$.

The average entropy, or entropy per character (a, b, c, ... up to z), which is characterized as:

$$\frac{-\log_2 P(abc \ldots z)}{\text{length}(abc \ldots z)}$$

can also be utilized in a similar manner to recognize and identify chaff. The unit of measurement for entropy is "bits."

There are many ways to obtain the probability of a character sequence. For example, a character n-gram language model can be trained on known good email messages, by using a complete corpus of good and bad email, and/or even by using a non-email database. Other heuristics also can be employed to detect high entropy or the average entropy. For instance, lists of common letter pairs or triples (e.g., valid character sequences or 2 and 3 letters, respectively) can be made. Following, the percentage of pairs or triples in any given character sequence that do not occur according to such lists can be included in the entropy determination of that character sequence.

In practice, the relative entropy can also be very useful in providing an advanced and robust spam detection system. More specifically, the average entropy can be detected at the beginning or end of a subject line as being high or relatively high compared to the middle of the subject line. In practice, for instance, the average entropy at the beginning of a subject line could be 0.5 bits higher than in the middle of the subject line.

Alternatively or in addition, the average entropy at the end or at the beginning of a message can be high compared to the average entropy of the whole message, or can be high compared to the average entropy of the middle of the message. For example, the average entropy at the end of a message could be at least 1 bit higher than the middle of the message (e.g., number of units can be converted into a percentage or factor). Each of these detected events can be a separate feature. Hence, many features are possible.

In addition to random character sequences, a large percentage of spam includes an image instead of text. Images are merely a sequence of 1's and 0's or other numbers. Because of this, spammers can input a minimal amount of static in the image number sequence to pass through conventional spam filtering systems successfully. Thus, the entropy of images can also be determined in a similar manner as the entropy of character sequences. In addition, images detected to be in more than one message can be compared to each other. If they are found to be substantially similar, then all mail including the same or substantially the same image can be blocked.

Finally, the features 670 relating to the entropy events for character sequences and image sequences can be used by the filter training component 680 to train a machine learning filter.

Turning now to FIG. 7, there is a block diagram of an exemplary feature generation system 700 that facilitates spam detection in accordance with an aspect of the present invention. The system 700 comprises a message server 710 whereby a sender 720 sends a message 730, which is delivered to the message server 710 before it reaches its recipient (s). At the message server 710, the message can be parsed by a message header analyzing component 740, an image processing component 750 and/or a message and feature sizing component 760 to yield a myriad of features.

The message header analyzing component 740 analyzes substantially all features of a message header in connection with training a machine learning filter. In particular, machine learning can be employed to automatically identify all useful header features. One approach involves creating features based at least in part upon the presence or absence of header line types such as "X-Priority", for example, as well as specific header types, such as "X-Priority: 3", for example. In addition, header lines for unsubscribing are useful to identify spam more readily.

Some header lines can be specifically excluded as well according to user preferences. In addition, content of header lines such as the type of mail software being used by the sender can be useful in detecting spam. Examining and analyzing all header lines for their presence, absence, and/or content demonstrates an improvement over traditional machine learning algorithms, which are limited to using features in the subject line and body of messages. Some machine learning algorithms do employ specific features based on email headers but previous approaches have not used all or substantially all possible features in the header lines.

Since spammers like to use images rather than text because it is more difficult and time consuming for filters to analyze images rather than text, the image processing component 750 can be employed to parse out a variety of features based on images included in the message. For example, number of images, location of images (e.g., embedded in the message or externally linked), and/or types of images (e.g., JPGs and/or GIFs) can be ascertained from the message and used as features. In addition, the size (e.g., bytes) as well as X-Y dimensions of the image(s) can be determined with minimal processing, particularly with respect to images embedded in the message.

To avoid blocking legitimate mail containing personal digital photos, special (typically positive) features can be created where the image size matches a common size and/or dimension produced by digital cameras. Features can also relate to the image size in bytes as well as the total area of the images. Finally, features relating to whether the image(s) in the message links to somewhere else (e.g., external to the message) can be indicative of spam since most spammers include external links in their spam.

Alternatively, messages can also include clickable images, whereby the image itself is used as a clickable hyperlink instead of as externally-linked image. In this instance, HTML text in the message contains a tag pattern such as <A HREF="first URL"><IMG SRC="second URL"></A>. It should be appreciated that the first and second URL are different URLs. Hence, features relating to at least a portion of the tag pattern can be used in training a spam filter. In general, HTML attributes and their respective locations within a tag pattern can be indicative of spam since most spammers try to get around spam filters using images rather than text. Thus, such information can be extracted as features to be used for filter training purposes.

Because very little spam is very big, many different size features can be utilized with the size granularized into one or more buckets by the message sizing component 760. One approach involves features for a message size >100 bytes, >200 bytes, >400 bytes, and up to >b bytes (where b is an integer greater than or equal to one). This granularization can be based on overlapping buckets such that a message of size 500 bytes would be associated with features for size >100, >200, >400. Alternatively, it can be based on non-overlapping buckets. That is, each bucket pertains to a specific size of a message such that one size feature is associated with each message. For instance, there is a bucket for a message size <100 bytes; 100≤size <200 bytes; 200≤size <400 bytes, up to b bytes.

In a second approach, the message sizing component can also be applied to subject lines and display names on a smaller size scale since spam and/or spam-like messages tend to have larger subject lines and display names due to the presence of chaff, for example.

Once again, as the message is being parsed and bits of information are being identified, a feature generating component 770 can generate the features from this information and then communicate them or a selected portion of them to be used in conjunction with a filter training component 780.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 8, there is illustrated a flow diagram of an exemplary method 800 that facilitates generating features in connection with advanced spam detection. The method 800 can begin by receiving a message at 810. At least a portion of the message can be parsed at 820 by any suitable email parsing component whereby features corresponding to the message's origination information are generated. The features can be combined into pairs at 830. At 840, the most useful pairs of features can be selected and a filter can be trained with such feature pairs using a machine learning algorithm at 850. The method 800 can be repeated as often as desired to sufficiently train the filter.

There are many features derived from the origination information of a message but some of these features are more useful than others in distinguishing spam from legitimate mail. In particular, features such as the IP address and the related subnet are very difficult for a spammer to modify or disguise. Thus, for legitimate users, these features should match other features such as the sender's alleged machine name and/or the sender's alleged time zone. Accordingly, when these pairs of features are examined, a match among each pair of features indicates a stronger likelihood that the message is legitimate (e.g., not spam). Conversely, when the pair does not match, there is a stronger likelihood that the message is spam.

Turning now to FIG. 9, there is illustrated a flow diagram of an exemplary method 900 of employing a trained filter of FIG. 8 in accordance with an aspect of the present invention. In particular, the method 900 comprises receiving a message at 910, parsing the message to generate one or more origination features at 920, and then pairing up the features at 930 to obtain the most useful feature pairs. At 940, the feature pairs are passed through the machine learning filter to determine whether the particular message is more spam-like. At 950, a verdict can be obtained from the machine learning system as to the spaminess of the message. For example, the verdict can be in the form of a probability corresponding to the likelihood that the message is spam.

Additional features to enhance spam detection can be created such as those depicted in FIG. 10. In FIG. 10, there is illustrated a flow diagram of an exemplary method 1000 that involves receiving one or more messages at 1010, walking through the text of the message and/or subject line to create features for each run of characters up to length n at 1020 as well as features for each sub-length of character sequences at 1030.

Furthermore, features can be created for character n-grams based on the position of the n-grams (e.g., beginning, end, middle of subject line and/or message body) at 1040. At 1050, features relating to the relative entropy of character sequences as they occur at the end and/or beginning compared to the middle of the subject line and/or message body at can also be generated. High entropy and the entropy per character (e.g., average entropy) of a character sequence can be determined and employed as features as well at 1050. Finally, at 1060, the features can be used to train a machine learning filter. The method 1000 can be repeated until the filter is substantially trained with a desired number of messages, entropy events, and/or character sequences.

FIG. 11 is a flow diagram of an exemplary method 1100 which employs the filter trained in accordance with FIG. 10 to facilitate detecting spam. The method 1100 comprises receiving a message at 1110, scanning at least a portion of the message for character sequences that match and/or do not match a list of valid character sequences (e.g., of multiple lengths) at 1120, and detecting entropy of at least a portion of the character sequences of a message and/or subject line, including those character sequences not found on a list of valid character sequences at 1130. At 1140, the detected events are used as features and passed through a machine learning filter. At 1150, a verdict is obtained from the machine learning system as to whether the message is more spam-like than not.

Figures 12, 13:
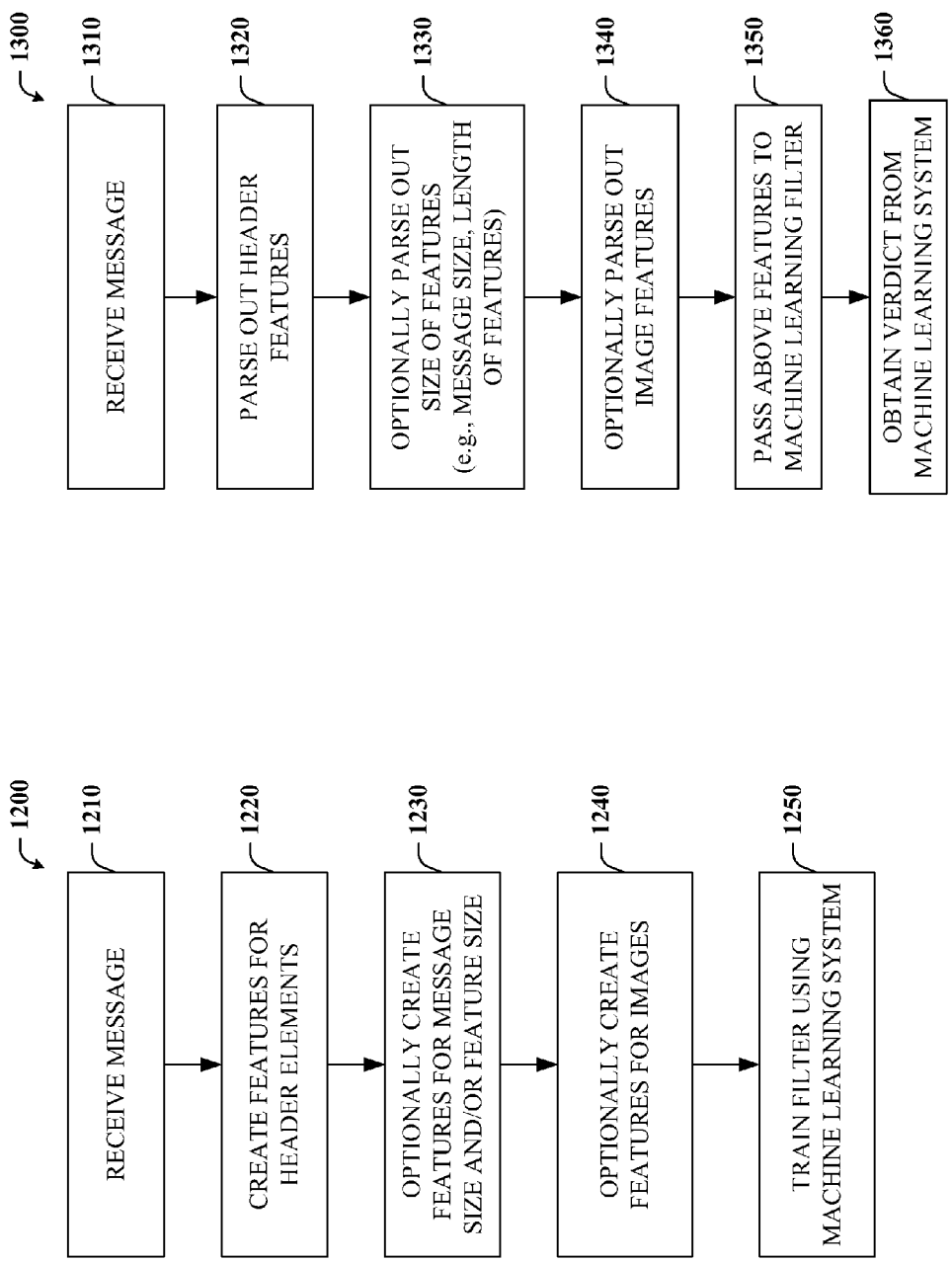
FIG. 12 is a flow diagram of an exemplary method that facilitates creating features which can be used to train a filter in accordance with an aspect of the present invention.
FIG. 13 is a flow diagram of an exemplary method that facilitates employing the trained filter of FIG. 12 to identify spam and/or spam-like messages.

Turning now to FIGS. 12 and 13, there are flow diagrams of exemplary processes 1200 and 1300, respectively, which facilitate generating advanced features for use by a machine learning algorithm in accordance with another aspect of the subject invention. Initially, the method 1200 involves receiving one or more messages at 1210 whereby features can be created by parsing and analyzing the header lines at 1220. In addition, features relating to message and/or feature size (e.g., message size, display name length, subject line) can length) can optionally be created at 1230. At 1240, any images in the message can be analyzed with respect to size, location (internal to message or external link), and/or quantity, among others, to generate further features. Substantially all features created can be employed in the training of a filter using a machine learning system at 1250.

The trained filter of FIG. 12 can be applied to new messages as described in the exemplary process 1300 of FIG. 13. At 1310, one or more messages are received. At 1320, header features are parsed from the message. Optionally, features corresponding to message and/or feature size and/or image characteristics are parsed as well from the message at 1320 and at 1330, respectively. At 1340, these features can be passed through or examined by a machine learning filter. A verdict is obtained at 1350 indicating an amount or a probability of spaminess of the message based at least in part upon the features parsed therefrom.

Figure 14:
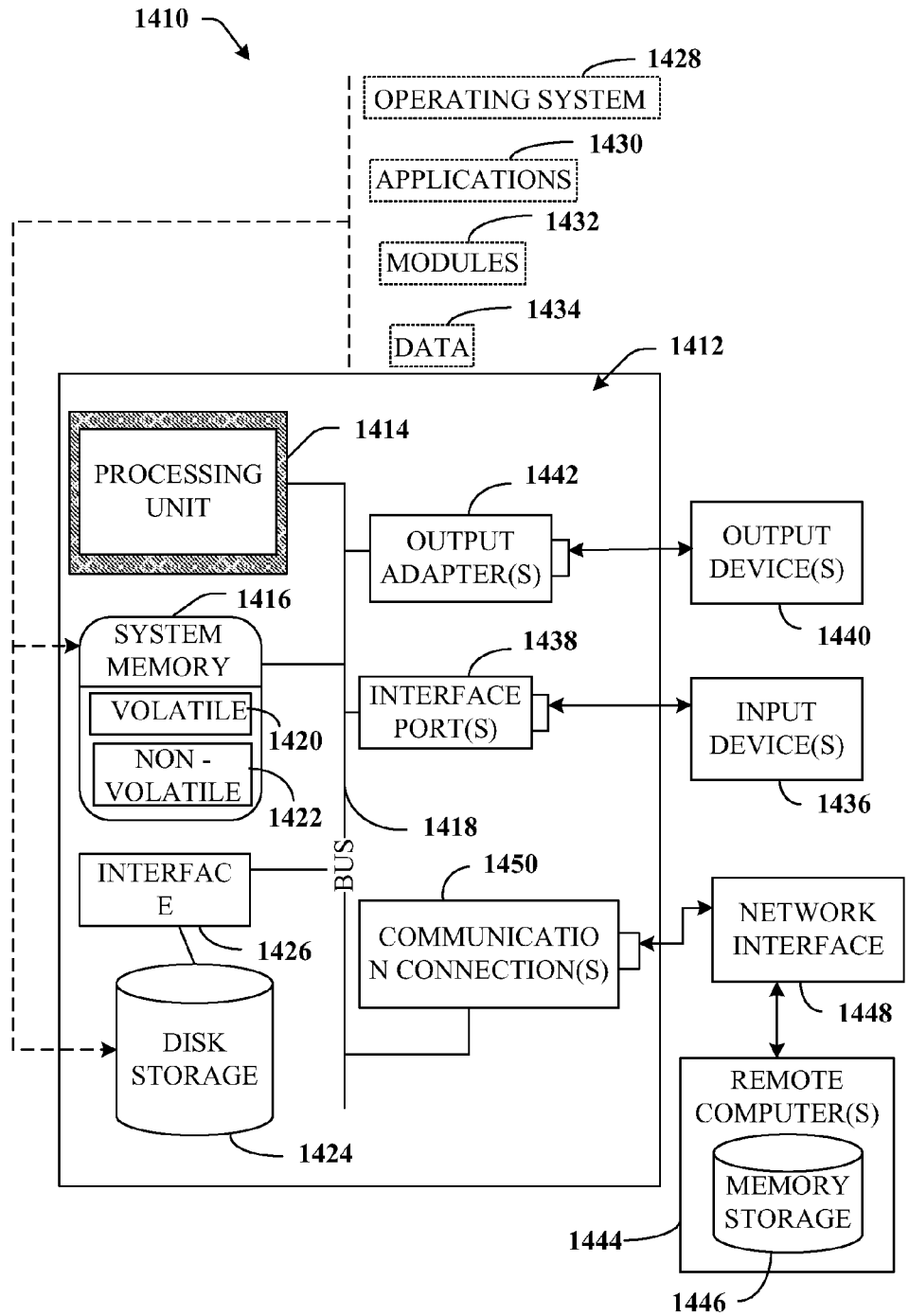
FIG. 14 is a schematic block diagram of an exemplary communication environment in accordance with the present invention.

In order to provide additional context for various aspects of the present invention, FIG. 14 and the following discussion are intended to provide a brief, general description of a suitable operating environment 1410 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples the system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method for filtering messages, comprising:
   receiving a first electronic mail (email) message;
   analyzing a portion of the first email message by searching for character sequences that are indicative of spam, wherein the character sequences correspond to one or more runs of characters of a particular run length including individual lengths of characters and sub-lengths of characters that are not restricted to whole words or space-separated words;
   determining a degree of randomness associated with an individual character sequence of the character sequences;
   generating a feature relating to the individual character sequence based at least partly on the degree of randomness associated with the individual character sequence;
   training a machine learning filter using at least the feature to generate a trained machine learning filter;
   employing the trained machine learning filter to obtain a verdict as to whether one or more features of a second email message indicate that the second email message is likely to be spam, and
   filtering the second email message based at least in part on the verdict.

2. A method as recited in claim 1, wherein the character sequences comprise character n-grams that are indicative of spam-like messages.

3. A method as recited in claim 2, wherein the character n-grams are located in at least one of a from address, a subject line, a text body, an html body, or an attachment.

4. A method as recited in claim 1, wherein the first email message comprises at least one of foreign language text, Unicode character types, or other character types not common to English.

5. A method as recited in claim 4, wherein the foreign language text comprises substantially non-space separated words.

6. A method as recited in claim 1, wherein the character sequences that are indicative of spam comprise strings of random characters.

7. A method as recited in claim 1, wherein the analyzing the portion of the first email message comprises processing at least a portion of the first email message in which the individual character sequence occurs.

8. A method as recited in claim 7, wherein the processing at least the portion of the first email message comprises determining an average degree of randomness associated with the portion of the first email message, and wherein the feature relates to a comparison between the degree of randomness associated with the individual character sequence and the average degree of randomness associated with the portion of the first email message.

9. A method as recited in claim 7, further comprising calculating an entropy of a particular run of characters of the one or more runs of characters and employing the entropy as an additional feature in connection with training the machine learning filter.

10. A method as recited in claim 9, wherein the entropy is an average entropy calculated as an entropy per character of the particular run of characters.

11. A method as recited in claim 9, wherein the entropy is a relative entropy determined by a comparison of a first entropy of a first particular run of characters at a first location within the first email message relative to a second entropy of a second particular run of characters at a second location within the first email message.

12. A method as recited in claim 11, wherein the first location and the second location comprise one of a beginning of a message body of the first email message, a middle of the message body of the first email message, or an end of the message body of the first email message, wherein the first location is different from the second location.

13. A method as recited in claim 1, wherein employing the trained machine learning filter to obtain the verdict as to whether the one or more features of the second email message indicate that the second email message is likely to be spam comprises:
 receiving the second email message;
 generating the one or more features of the second email message based on at least one of one or more runs of characters in the second email message and entropy determinations of the one or more runs of characters in the second email message;
 passing the one or more features of the second email message through the trained machine learning filter; and
 obtaining the verdict as to whether the one or more features of the second email message indicate that the second email message is likely to be spam.

14. A computer-implemented method for filtering messages, comprising:
 receiving a first electronic mail (email) message;
 analyzing one or more features of a message header associated with the first email message;
 analyzing a portion of the first email message by searching for character sequences that are indicative of spam, the character sequences corresponding to one or more runs of characters of a particular run length;
 determining a degree of randomness for an individual run of characters of the one or more runs of characters;
 determining an average degree of randomness for the portion of the first email message within which the individual run of characters occurs;
 generating a feature relating to the individual run of characters based at least in part on a comparison between the degree of randomness and the average degree of randomness; and
 training a machine learning spam filter using the feature to generate a trained machine learning spam filter;
 employing the trained machine learning spam filter to obtain a verdict as to whether one or more features of a second email message indicate that the second email message is likely to be spam, and
 filtering the second email message based at least in part on the verdict.

15. A method as recited in claim 14, wherein the one or more features of the message header comprise at least one of a presence or absence of at least one message header type, the at least one message header type comprising at least one of X-Priority, mail software, or a header line for unsubscribing.

16. A method as recited in claim 15, wherein the one or more features of the message header further comprise content associated with the at least one message header type.

17. A method as recited in claim 14, further comprising:
 analyzing at least a portion of the first email message for images and related image information;
 generating image features relating to one of the images and the related image information; and
 further training the machine learning spam filter using the image features.

18. A method as recited in claim 17, wherein the related image information comprises one or more of image size, image quantity, location of image, image dimensions, or image type.

19. A method as recited in claim 17, wherein the related image information comprises a first URL and a second URL such that the image is represented within a hyperlink.

20. A computer storage device having computer executable instructions stored thereon, which, when executed by one or more processors, cause the one or more processors to:
 analyze a first portion of a first electronic mail (email) message by searching for particular character sequences that are indicative of spam, wherein the particular character sequences correspond to one or more runs of characters of a particular run length;
 analyze a second portion of the first email message by searching for instances of strings of random characters that are indicative of spam;
 analyze a message header associated with the first email message;
 determining a degree of randomness associated with at least one of a run of characters of the one or more runs of characters, an instance of the instances of strings of random characters, or the message header;
 generate features comprising character sequence features relating to the particular character sequences, strings of random character features relating to the strings of random characters, message header features relating to the message header, and a feature based on the degree of randomness; and
 train a machine learning spam filter using the features that are generated to generate a trained machine learning spam filter;
 employing the trained machine learning spam filter to obtain a verdict as to whether one or more features of a second email message indicate that the second email message is likely to be spam, and
 filtering the second email message based at least in part on the verdict.

* * * * *